(12) United States Patent
Jasiulek et al.

(10) Patent No.: US 10,766,652 B2
(45) Date of Patent: Sep. 8, 2020

(54) CARRIER ELEMENT AND PACKAGING DEVICE FOR PACKAGING AT LEAST ONE PRODUCT INTO AT LEAST ONE PACKAGE

(71) Applicant: Roche Diagnostics Operations, Inc., Indianapolis, IN (US)

(72) Inventors: Thomas Jasiulek, Mannheim (DE); Andreas Trapp, Lampertheim (DE)

(73) Assignees: Roche Diagnostics GMBH, Manheim (DE); Roche Diagnostics Operations, Inc., Indianapolis, IN (US)

( * ) Notice: Subject to any disclaimer, the term of this patent is extended or adjusted under 35 U.S.C. 154(b) by 1431 days.

(21) Appl. No.: 14/556,479

(22) Filed: Dec. 1, 2014

(65) Prior Publication Data

US 2015/0082754 A1     Mar. 26, 2015

Related U.S. Application Data

(63) Continuation of application No. PCT/EP2013/060566, filed on May 23, 2013.

(30) Foreign Application Priority Data

Jun. 1, 2012   (EP) .................................... 12170410

(51) Int. Cl.
    *B65B 43/52*       (2006.01)
    *B65B 43/54*       (2006.01)
    (Continued)

(52) U.S. Cl.
    CPC .............. *B65B 43/52* (2013.01); *B65B 43/54* (2013.01); *B65B 65/003* (2013.01);
    (Continued)

(58) Field of Classification Search
    CPC ...... B65G 17/32; B65G 17/323; B65G 17/34; B65G 21/2027; B65G 21/2036; B65B 43/50; B65B 43/60; B65B 43/54
    (Continued)

(56) References Cited

U.S. PATENT DOCUMENTS 3,852,938 A * 12/1974 Graff ..................... B65B 21/183
                                                            414/737
4,754,445 A *  6/1988 Young .................. G11B 17/035
                                                            198/346.2
(Continued)

FOREIGN PATENT DOCUMENTS

DE     102005037117 A1    5/2006
EP          1837208 A2    9/2007
(Continued)

OTHER PUBLICATIONS

International Search Report dated Jul. 17, 2013, in Application No. PCT/EP2013/060566, 4 pages.
(Continued)

*Primary Examiner* — Dariush Seif
(74) *Attorney, Agent, or Firm* — Dinsmore & Shohl, LLP

(57) ABSTRACT

A carrier element for use in a packaging device is provided wherein the carrier element is connectable with at least one transport device of the packaging device. The carrier element comprises at least one receiving surface for receiving at least one package. The receiving surface comprises at least one suction opening for fixing the package by suction. The carrier element further comprises at least one pressure reservoir connected to the suction opening. The carrier element further comprises at least one pressure sensor for measuring a pressure inside the pressure reservoir. A packaging device for packaging at least one product into at least one package is also disclosed. The packaging device comprises at least one carrier element and at least one transport
(Continued)

device, wherein the carrier element is connected to the transport device.

17 Claims, 4 Drawing Sheets

(51) Int. Cl.
  *B65G 17/34* (2006.01)
  *B65B 65/00* (2006.01)
  *B65G 17/46* (2006.01)
  *B65G 17/32* (2006.01)
  *B65G 47/84* (2006.01)

(52) U.S. Cl.
  CPC ........... *B65G 17/323* (2013.01); *B65G 17/34* (2013.01); *B65G 17/46* (2013.01); *B65G 47/843* (2013.01)

(58) Field of Classification Search
  USPC ...... 198/468.2, 468.4, 470.1, 471.14; 53/473
  See application file for complete search history.

(56) References Cited

U.S. PATENT DOCUMENTS

| | | | |
|---|---|---|---|
| 6,291,991 B1 | 9/2001 | Schnell | |
| 6,752,581 B1* | 6/2004 | Lust | B29C 31/006 198/468.4 |
| 8,026,113 B2* | 9/2011 | Kaushal | H01L 21/67253 257/E21.521 |
| 8,561,779 B2* | 10/2013 | Meyer | B65B 43/52 198/339.1 |
| 2010/0180550 A1* | 7/2010 | Yamamoto | B65B 3/06 53/459 |
| 2010/0263986 A1* | 10/2010 | Meyer | B65B 43/52 198/339.1 |
| 2011/0023423 A1* | 2/2011 | Iwasaki | B65B 1/32 53/510 |

FOREIGN PATENT DOCUMENTS

| | | |
|---|---|---|
| EP | 2192396 A1 | 6/2010 |
| EP | 2441690 A1 | 4/2012 |
| WO | 2012/057680 A1 | 5/2012 |

OTHER PUBLICATIONS

"Micro-mechanical pressure sensors," 2010, Robert Bosch GmbH, Sensoren im Kraftfahrzeug, 1st Edition, pp. 134-136, with English translation.

* cited by examiner

CARRIER ELEMENT AND PACKAGING DEVICE FOR PACKAGING AT LEAST ONE PRODUCT INTO AT LEAST ONE PACKAGE

CROSS-REFERENCE TO RELATED APPLICATIONS

This application is a continuation of International Application No. PCT/EP2013/060566, filed 23 May 2013, which claims the benefit of European Patent Application No. 12170410.0, filed 1 Jun. 2012, the disclosures of which are hereby incorporated by reference in their entirety.

BACKGROUND

The disclosure generally relates to the field of packaging one or more products or goods into at least one package such as a folded box. Specifically, the disclosure relates to a carrier element for use in a packaging device, a vacuum monitoring device and to a packaging device for packaging at least one product into at least one package. The disclosure further refers to a method for packaging at least one product into at least one package and to a use of a wireless pressure sensor for monitoring a pressure inside a pressure reservoir of a carrier element in a packaging device for packaging at least one product into at least one package. The disclosure typically may be used in the field of packaging one or more diagnostic elements and/or one or more analytical elements and/or one or more therapeutic or diagnostic substances into one or more packages. Thus, the disclosure typically may be used in the field of therapeutics and/or diagnostics, such as for packaging therapeutic and/or diagnostic goods. However, other applications are feasible.

In packaging technology, a large number of packaging devices are known to the skilled person. Without restricting further embodiments of the type of package to be used, the invention, in the following, specifically is disclosed in the context of packages of the type of folded boxes, typically folded cardboard boxes. These folded boxes typically may be used as secondary packages, wherein the product to be packaged may firstly be packaged into at least one primary package such as a tube, a vial or hardcover package. This primary package may then be placed into the folded box as a secondary package, by using a packaging device, such as a stepwise packaging device.

During the packaging process by using a stepwise packaging device, the package typically passes a plurality of working stations of the packaging device. Therein, the packaging process is more and more completed from working station to working station, wherein, typically, at the end of the process a product ready to be sold leaves the packaging device.

In this process, typically, the packages, in the packaging device, are supported by carrier elements. These carrier elements typically are guided by one or more transport devices of the packaging device and, generally, are reused after completing a packaging cycle. Thus, generally, the transport devices in packaging devices typically used in large-scale packaging are guided in a closed-loop system, such as in a closed-loop rail system.

Besides the actual product to be packaged, several other components may be inserted into the package, such as data carriers comprising data relating to the product and/or instruction leaflets comprising information and/or directions for use of the product. As an example, one or more data carriers comprising information about the product may be inserted into the package before closing the packaging.

Several packaging devices are commercially available. Thus, as an example, packaging devices are commercially available from Eckhard Polmann GmbH, 46562 Voerde, Germany and/or from Igus GmbH, 51147 Köln, Germany.

One essential feature in many packaging devices, generating a considerable amount of technical effort, resides in a precise positioning of the package during the packaging process. Specifically, as mentioned above, the package, on its way through the packaging device, may pass a plurality of working stations in which several working steps of the packaging process may be performed. Thus, besides loading the package itself onto the carrier element, one or more loading steps may take place, in which one or more products, unpackaged or in an already pre-packaged state, and/or one or more additional items are loaded into the package. Further, one or more closure stations may be provided in which the package is closed, such as by simply folding one or more folds or flaps of the package into a closed state and/or by applying additional closure elements such as a glue. In all these steps of packaging, the package has to be kept in a precisely defined position on the carrier element. Thus, the above-mentioned working stations typically comprise the use of one or more actuators and/or loading elements, which, partially, may be damaged by an imprecise positioning of the packages on the carrier elements.

For keeping the package in place, a plurality of techniques may be used. Thus, as known in the art of packaging devices, vacuum suction techniques may be used for positioning the package.

As an example, U.S. Pat. No. 8,561,779 B2 discloses a carrier for cardboard boxes, having a support surface for transporting blanks of the cardboard boxes. The support surface has at least one suction opening which is connectable to a vacuum source.

US 2011/0023423 A1 discloses a suction control apparatus adapted for use in a packaging machine for conveying and packaging a belt-shaped film while the film is being suctioned by a suction-type film conveyor. The suction control apparatus includes a proper vacuum-degree determination section and a vacuum-degree control unit. The proper vacuum-degree determination section is configured and arranged to determine a proper degree of vacuum of the suction-type film conveyor, which is less than a reference value set in advance. The vacuum-degree control unit is configured to set the degree of vacuum to a first value corresponding to the proper degree of vacuum determined by the proper vacuum-degree determination section.

However, when using vacuum suction in connection with movable components such as the components of a transport device, the vacuum supply to the actual carrier elements remains a major challenge. In many cases, a permanent vacuum supply has to be provided to the single carrier elements moving along the path of the transport device, requiring complicated tubing and/or complicated vacuum interfaces. Further, specifically in complex transport devices and complex vacuum systems, vacuum leakages and/or unwanted pressure failures may cause significant problems, leading to potential decreases of suction forces and, thus, to unwanted depositioning of the packages. The latter specifically may occur during operational lifetime of the packaging device, such as by abrasion processes, without any predictability. Significant damages to the packaging equipment and/or expensive downtimes of the packaging device may be but one of the consequences.

In other fields of technology, various techniques for providing and/or monitoring an overpressure and/or a vacuum are known. Thus, as an example, EP 2 192 396 A1 discloses an assembly line for assembling a servo brake. The assembly line comprises a support carrier having a pressure sensor. The pressure sensor is adapted to measure the pressure inside a chamber of a servo brake resting on the carrier during assembly.

EP 1 837 208 A2 discloses a sensor used in automotive technology, specifically a tire condition monitor. The tire condition monitor includes a circuit board mounted on a wheel for detecting a pneumatic pressure in an interior of a tire.

U.S. Pat. No. 8,026,113 B2 discloses a method and system for non-invasive sensing and monitoring of a processing system employed in semiconductor manufacturing. The system comprises a plurality of non-invasive sensors forming a wireless sensor network. Sensor signals are acquired tracking a radial or abrupt change in a processing state of a system component during a process that includes a flow of a process gas in the processing system.

WO 2012/057680 A1 discloses a roller for a belt transporter comprising a body that is mounted in bearings on an axis of rotation such that it can rotate. The body comprises measurement sensors for registering measured values of the roller, and an electric arrangement that transmits and receives signals.

Despite the advantages provided by the systems and methods disclosed by the above-mentioned prior art, almost all of the above-mentioned challenges specific to the field of packaging technology remain. Thus, still, there exists a major need for a packaging technology capable of performing complex packaging process steps requiring a high precision of positioning of the packages. Specifically in modular packaging devices adapted for high-throughput packaging of goods such as pharmaceutical and/or diagnostic products, still a need for increased precision and reliability of package positioning exists.

It is therefore an objective of the present disclosure to provide devices and methods for packaging at least one product, by at least partially overcoming the above-mentioned shortcomings of known devices and methods. Specifically, devices and methods shall be disclosed which are suitable for high-precision positioning of packages during a packaging process even under high-speed and high-throughput conditions, at a high degree of reliability.

SUMMARY

It is against the above background that the embodiments of the present disclosure provide certain unobvious advantages and advancements over the prior art. In particular, the inventors have recognized a need for improvements in carrier elements and packaging devices for packaging at least one product into at least one package.

In accordance with one embodiment of the present disclosure, a carrier element for use in a packaging device is provided, wherein the carrier element is connectable with at least one transport device of the packaging device, the carrier element comprises at least one receiving surface for receiving at least one package, the receiving surface comprises at least one suction opening for fixing the package by suction, the carrier element further comprises at least one pressure reservoir connected to the suction opening, and the carrier element further comprises at least one pressure sensor for measuring a pressure inside the pressure reservoir.

In accordance with another embodiment of the present disclosure, a vacuum monitoring device, comprising at least one carrier element according to the disclosure is provided, the vacuum monitoring device further comprising at least one receiver, wherein the carrier element is adapted for wireless transmission of at least one pressure information indicating the pressure inside the pressure reservoir of the carrier element to the receiver.

In accordance with yet another embodiment of the present disclosure, a packaging device for packaging at least one product into at least one package is provided, wherein the packaging device comprises at least one carrier element according to the disclosure, wherein the packaging device further comprises at least one transport device, wherein the carrier element is connected to the transport device, wherein the packaging device is adapted to measure the pressure inside the pressure reservoir of the carrier element by using the pressure sensor of the carrier element.

In accordance with still yet another embodiment of the present disclosure, a method for packaging at least one product into at least one package is provided, wherein the packaging device according to the disclosure is used, the method comprising the following steps: at least one first loading step, wherein in the first loading step at least one package is loaded onto the at least one carrier element of the packaging device, wherein the package is fixed to the receiving surface of the carrier element by suction; at least one second loading step, wherein in the second loading step at least one product is loaded into the package; at least one measuring step, wherein in the measuring step the pressure inside the pressure reservoir of the carrier element is measured by using the pressure sensor, thereby generating at least one pressure information indicating the pressure inside the pressure reservoir of the carrier element; and at least one removal step, wherein in the removal step the package is removed from the carrier element.

These and other features and advantages of the embodiments of the present disclosure will be more fully understood from the following detailed description taken together with the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which.

Figure 1:
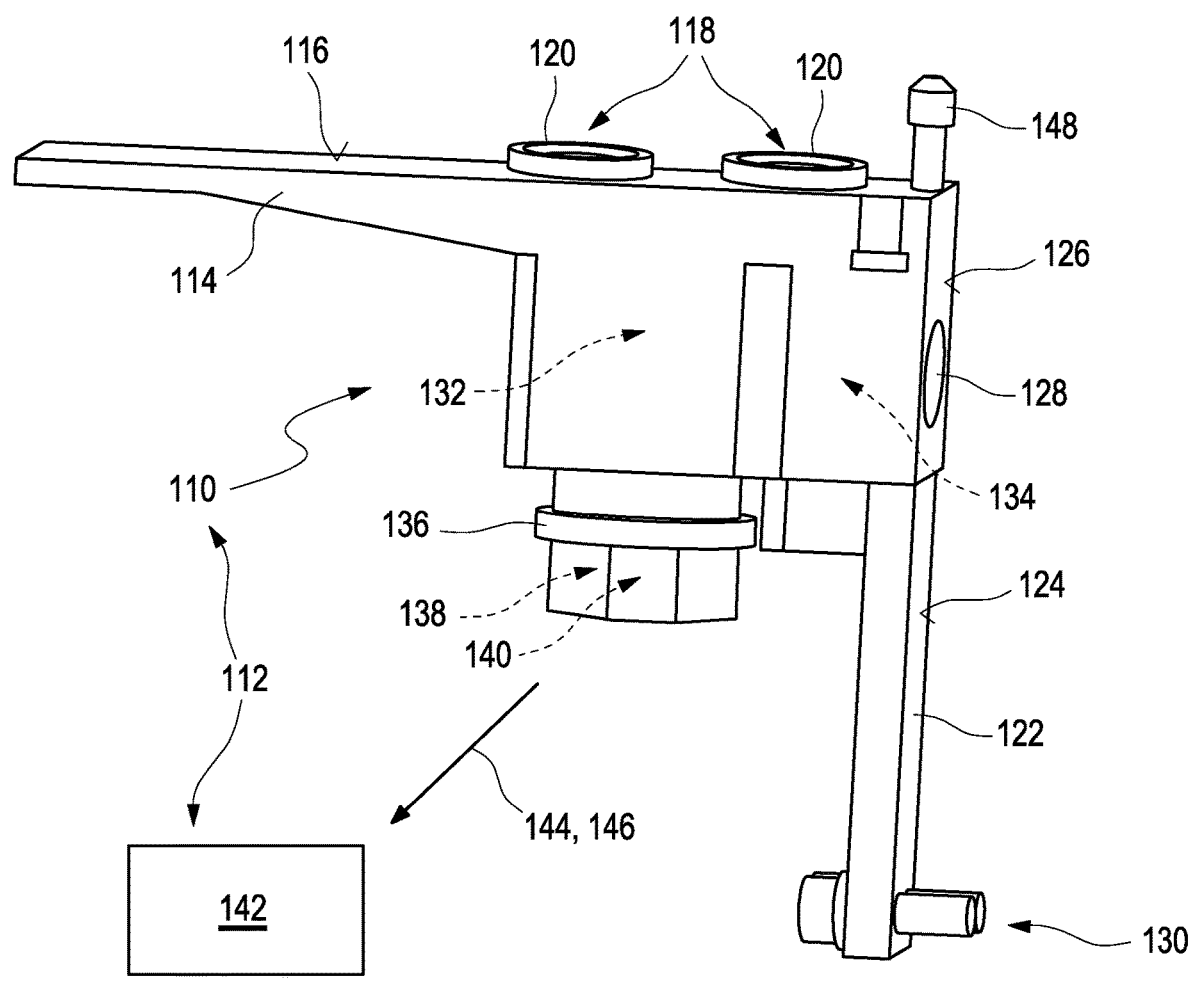
FIG. 1 shows a side-view of an embodiment of a carrier element and a schematic view of a vacuum monitoring device.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

As used herein and in the following, the expressions "comprise", "have" or "include" may both refer to an exclusive and a non-exclusive list of components. Thus, the expressions "A comprises B", "A has B" or "A includes B"

may both refer to a situation in which A solely consists of B without any other components and to the situation in which A, besides B, comprises one or more further components or constituents.

In a first aspect of the present disclosure, a carrier element for use in a packaging device is disclosed. As used herein, the term carrier element refers to an arbitrary element capable of carrying articles in a packaging device. Specifically, the carrier element may be a movable carrier element adapted to subsequently position the one or more articles in different positions of the packaging device. Specifically, the carrier element may be adapted for positioning one or more packages such as folded boxes, typically folded cardboard boxes, which may serve to accommodate one or more products to be packaged.

As further used herein, the term packaging device refers to an arbitrary device adapted for packaging of at least one article into at least one package, typically in a fully automatical manner and/or a semi-automatical manner. The packaging device, as outlined in further detail below, may comprise a plurality of work stations and/or work positions, in which a plurality of packaging steps is performed. The carrier element may be adapted to subsequently position the package in the work positions or work stations.

Generally, the verb "packaging" or grammatical variations thereof refer to a process in which one or more articles are fully or partially surrounded by one or more deformable or undeformable wraps and/or cases. The undeformable or deformable wraps or cases themselves are referred to by the noun "package". As outlined above, the package typically may comprise one or more folded boxes, such as one or more folded cardboard boxes. Additionally or alternatively, other types of packages may be used, such as boxes and/or vials and/or tubes.

The carrier element typically may be or may comprise an element which may be handled independently from remaining components of the packaging device. Thus, the carrier element may form a self-sufficient or self-sustaining unit which may be handled independently from a transport device of the packaging device, typically even with the package received and/or positioned on the carrier element. The carrier element thus typically may form a self-sustaining unit of the packaging device, which, typically, may be introduced into the packaging device reversibly and/or may be removed from the packaging device.

The carrier element typically may be formed fully or partially from at least one rigid material. Thus, the carrier element may fully or partially be formed from a metallic material such as stainless steel and/or aluminum and/or from a plastic material.

The carrier element is connectable with at least one transport device of the packaging device. Typically, the carrier element may be connectable reversibly with the transport device. For the purpose of connection, the carrier element may comprise one or more connection elements for connecting the carrier element with the transport device of the packaging device. Thus, the carrier element may comprise one or more screws and/or bolts and/or holes and/or other types of connecting elements adapted to interact with corresponding connecting elements of the transport device.

As used herein, the term transport device refers to an arbitrary device or system of the packaging device which is adapted to provide a positioning of the carrier element in a plurality of predetermined positions. Thus, the transport device may comprise at least one of a chain, a belt, a rail or any arbitrary combination thereof. As outlined in further detail below, the transport device typically may comprise a closed-loop transport device, such as a closed-loop transport chain and/or a closed-loop transport rail. However, other types of transport devices may be used additionally or alternatively.

The carrier element comprises at least one receiving surface for receiving the at least one package. With regard to the term "package", reference may be made to the definition provided above. Typically, the at least one package which may be received on the at least one receiving surface of the carrier element may comprise at least one secondary package, i.e., a package which fully or partially surrounds one or more packages referred to as "primary packages", which, themselves, may fully or partially accommodate the actual product to be packaged. As outlined above, the package, typically the secondary package, specifically may comprise one or more folded boxes, typically one or more folded cardboard boxes.

As used herein, the expression "receiving surface" may refer to an arbitrary surface of the carrier element which may get into contact with the at least one package. Specifically, the at least one package may rest on the at least one receiving surface, such that the receiving surface typically fully or partially carries the at least one package. Thus, the receiving surface typically may comprise one or more flat surfaces which, typically, may be oriented in a substantially horizontal fashion. As used herein, the term "substantially" in conjunction with an orientation such as a horizontal or a vertical orientation typically refers to a situation in which the orientation exactly corresponds to the named orientation such as the vertical or horizontal orientation. However, slight deviations of the orientation may be possible, such as orientations deviating from the horizontal or vertical orientation, respectively, by no more than 20°, typically by no more than 10° and most typically by no more than 5°. The receiving surface typically may have a surface area which allows for positioning the full package on the receiving surface, typically in a predetermined orientation.

The receiving surface comprises at least one suction opening for fixing the package by suction. The suction opening may have an arbitrary shape and/or a cross-section such as a circular and/or round cross-section and/or a polygonal shape, such as a square shape. The suction opening may be connected to a suction channel extending into a casing or body of the carrier element, typically connecting the suction opening with the at least one pressure reservoir as outlined below.

The carrier element further comprises at least one pressure reservoir connected to the suction opening. Thus, the pressure reservoir may be connected to the suction opening by at least one pressure channel and/or by at least one suction channel extending through a casing and/or body of the carrier element. The pressure reservoir typically is adapted to receive and hold a vacuum or underpressure. Thus, the pressure reservoir may comprise one or more cavities inside the carrier element, which, typically, may be sealed by one or more sealing elements in order to prevent a pressure equalization between the interior of the pressure reservoir and an ambient atmosphere, such as over a predetermined duration of time of at least 10 s, typically of at least 1 min. Such durations of time represent typical turnaround time of packaging devices. Typically, the pressure equalization between the interior of the pressure reservoir and the ambient atmosphere is prevented even longer, such as over a predetermined duration of time of at least 10 min, typically of at least 30 min and more. Such long durations are advantageous especially during planned and unplanned stops of the packaging device and process (e.g., for maintenance or repair purposes), because they obviate the unintended removal of the packages from the carrier element during these stops.

The carrier element further comprises at least one pressure sensor for measuring a pressure inside the pressure reservoir. Typically, the at least one pressure sensor is adapted for measuring a pressure of a vacuum inside the pressure reservoir. As used herein, the term pressure sensor may refer to an arbitrary element adapted to detect a pressure, typically a pressure of a vacuum. Typically, the pressure sensor may be adapted to generate at least one electric signal and/or electric information on the pressure.

For the purpose of the present disclosure, basically any arbitrary type of pressure sensor may be used. Thus, as an example, the at least one pressure sensor may comprise at least one micromechanical pressure sensor, such as a micromechanical pressure sensor disclosed in Robert Bosch GmbH: Sensoren im Kraftfahrzeug, $1^{st}$ edition 2010, Vieweg+Teubner Verlag, pages 134-136. Thus, the at least one micromechanical pressure sensor may comprise one or more membranes, the deformation of which due to pressure or pressure changes may be monitored by one or more electronic sensors, such as by one or more deformation-sensitive resistors. However, other principles of pressure measurement may be used instead. The pressure sensor may comprise one or more pressure sensors for measuring an absolute pressure and/or one or more pressure sensors for sensing a differential pressure. Further, as an example, pressure sensors as used in automotive technology may be used in the present disclosure, such as one or more tire pressure sensors. Thus, as an example, the tire condition monitor as disclosed in EP 1 837 208 A2 may be used. Additionally or alternatively, commercially available pressure sensors may be used, such as one or more commercially available tire pressure sensors. As an example, tire pressure sensors as commercially available by Tirecom AG, 9301 Rorschach, Switzerland, may be used, with or without hand-held pressure reader.

Typically, the at least one pressure sensor may be or may comprise a self-sustaining and/or autonomous pressure sensor. Thus, typically, the at least one pressure sensor may be or may comprise a wireless pressure sensor. Thus, as outlined in further detail below, the pressure sensor typically may be adapted for wireless data transmission and/or may comprise one or more onboard energy sources and/or energy storages for supplying the pressure sensor with electrical energy.

In the following, optional and advantageous details and/or further developments of the carrier element are disclosed. Thus, typically, the carrier element and, more typically, the at least one pressure sensor, is adapted for wireless transmission of at least one pressure information indicating the pressure inside the pressure reservoir to at least one receiver. As outlined in further detail below, the at least one receiver may be part of at least one packaging device making use of the carrier element. Thus, the at least one receiver may be part of a central control unit of the packaging device. Other embodiments are possible. The at least one receiver typically may be a radio receiver. For adapting the carrier element and, more typically, the pressure sensor for wireless transmission of the at least one pressure information, the carrier element and, more typically, the pressure sensor may comprise at least one communication module for wirelessly transmitting the pressure information. The communication module typically may comprise an integrated circuit and/or a semiconductor communication module, such as a radio transmission module and/or a RF transmission module. The at least one communication module may be part of the pressure sensor and/or may be integrated into the pressure sensor. Additionally or alternatively, the at least one communication module may be accommodated in a different part of the carrier element, such as in an electronic module of the carrier element.

The pressure information generally may be or may comprise an arbitrary type of information containing a quantifiable or numeric value in a coded or decoded form, representing the actual pressure inside the pressure chamber as measured by the pressure sensor. Thus, typically, the at least one pressure information may be or may comprise an arbitrary type of electric signal and/or electronic code indicating the pressure measured by the pressure sensor. Thus, the pressure information typically may comprise digital information in an encoded and/or clear format, such as an 8-bit pressure information and/or a 16-bit pressure information.

As outlined above, the carrier element, typically the pressure sensor, typically may be adapted for transmitting the pressure information via radio transmission to the at least one receiver. In this regard, an arbitrary type of radio transmission may be used. The transmitted data package may comprise additional information, such as for encoding the pressure information itself and/or for encoding a position of the carrier element emitting the pressure information and/or the temperature and/or identification information about the pressure sensor and the corresponding carrier device and/or the remaining lifetime of the energy source.

As an example, the radio transmission may take place in a radio frequency range of 1 MHz to 1000 MHz, typically 6 MHz to 870 MHz. Thus, the transmission may take place in a frequency band of 433.05 MHz to 434.79 MHz or at 433 MHz. Additionally or alternatively, a frequency band of 868 MHz to 870 MHz may be used, such as a transmission frequency of 868.3 MHz. Other transmission frequencies are possible, such as frequencies provided by national or regional laws or standards. As an example, radio transmission as typically used for so-called Short Range Devices (SRD) may be used.

The carrier element and, typically, the at least one pressure sensor, may further be adapted to transmit at least one identification information to the receiver. The identification information typically may be adapted to identify the carrier element, i.e., the carrier element emitting the pressure information. Thus, the at least one identification information may comprise a unique identifier adapted to uniquely identify the specific carrier element emitting the radio signal. Thus, the pressure information uniquely may be assigned to a specific pressure element and, thus, to a specific pressure reservoir in which the pressure is measured. Thus, generally, the at least one carrier element, and, more typically, the at least one pressure sensor, may be adapted to emit at least one radio signal, which, besides the at least one pressure information, may contain additional information, such as the at least one identification information. Additional information may be contained, such as information referring to the point of time at which the pressure actually is measured.

The carrier element may further comprise at least one electric energy storage for providing electric energy to the pressure sensor. Thus, typically, the at least one electric energy storage may comprise at least one battery and/or at least one electric accumulator. However, additionally or alternatively, other types of electric energy storage may be comprised, such as one or more supercapacitors. Providing the at least one electric energy storage, typically in combination with a wireless pressure sensor and/or a wireless transmission of the pressure information, may render the carrier element self-sustained. Thus, the carrier element typically may be handled independently from any other component of the packaging device, even in a fully functional state. Thus, the carrier element, even optionally with the package disposed thereon, may even be removed from the packaging device, such as for testing purposes and/or for maintenance purposes.

In order to further support the above-mentioned idea of the self-sustained embodiment of the carrier element, the carrier element typically may be reversibly connectable to the transport device. As outlined above, for this purpose, the carrier element may comprise one or more connecting elements which are adapted for a reversible connection to the transport device. Thus, one or more screws and/or one or more bolts and/or one or more holes such as through-holes may be comprised, for mounting the carrier element to the transport device, typically reversibly.

As outlined above, the carrier element typically may be handled independently from the transport device. Specifically, the carrier element may be adapted such that the carrier element itself is fully functional with regard to holding and/or receiving the package, even in a disconnected state in which the carrier element is disconnected from the transport device. Specifically, the carrier element may be adapted such that the suction of the package to the receiving surface may be an autonomous suction process which may be performed independently from the transport device, specifically independently from and/or without any vacuum supply via the transport device. Thus, as outlined above, the suction process may be functionally independent from the presence of the transport device such that the suction process may even take place when the carrier element is removed from the transport device and/or the packaging device, such as for maintenance purposes and/or for testing purposes.

The pressure reservoir typically may comprise at least one cavity inside a body of the carrier element. Thus, the reservoir may fully or partially be surrounded by material forming the body of the carrier element, such as wall material of the body. The cavity typically may be air-tight, such as by using one or more sealing elements, such that, besides the at least one suction opening, the cavity typically, at least in an operational mode, does not provide any further openings through which a pressure equalization between ambient atmosphere and the pressure reservoir may take place. The suction opening itself, in an operational mode, may be closed by the at least one package, such that the cavity is fully closed and capable of holding a vacuum inside the cavity.

Besides the at least one suction opening, the pressure reservoir may still comprise one or more additional openings. Thus, the at least one pressure reservoir may comprise at least one application opening for applying a vacuum to the pressure reservoir, the application opening typically being separate from the at least one suction opening. In order to close the application opening during operational mode, in order to prevent an equalization of pressure in between the pressure reservoir and the ambient atmosphere, the carrier element may further comprise at least one valve element connected to the application opening. The valve element typically may be adapted to sustain a vacuum inside the pressure reservoir, typically in a state, in which the suction opening is closed by the at least one package. Thus, in an operational mode, the at least one suction opening may be closed by the packaging, whereas the at least one optional application opening may be closed by the valve element, thereby sustaining the vacuum inside the pressure reservoir. The valve element generally may comprise an arbitrary valve element, such as at least one check valve. Additionally or alternatively, other types of valve elements may be used. The at least one valve element typically may be located inside an application channel connecting the application opening of the pressure reservoir to an ambient atmosphere and/or may form part of this application channel.

The optional valve element typically may be adapted to be opened, typically by mechanical influence, such as a mechanical action applicable from an outside the carrier element, wherein, by opening the valve element, a venting of the pressure reservoir may be initiated. Thus, a venting may be initiated by exerting a mechanical force onto a part of the carrier element and/or a part of the valve element, such as a mechanical pressure and/or a mechanical stress. Preferably, the mechanical influence may be exerted from an outer side of the carrier element, thereby initiating the venting of the pressure reservoir. The packaging device may comprise one or more venting devices adapted to exert the mechanical influence onto the carrier element when positioned in a specific venting position, such as in a removal position in which the at least one package is removed from the carrier element. Thus, by exerting the mechanical influence onto the valve element, the pressure reservoir may be vented, thereby reducing and/or removing the suction force from the package disposed on the receiving surface of the carrier element and, thus, freeing the package from the carrier element.

The application opening, as outlined above, typically may be spatially separated from the at least one receiving surface and, thus, typically may be separated from the at least one suction opening. As an example, the application opening may be located inside a substantially vertically oriented surface, wherein the receiving surface may be oriented substantially horizontally. With regard to the terms "substantially vertically" and "substantially horizontally" reference may be made to the definitions above. However, other types of orientations are possible.

Further optional embodiments refer to the suction opening. Thus, the at least one suction opening typically may comprise and/or may be connected to at least one vacuum cup. The at least one vacuum cup typically may comprise one or more deformable elements, such as one or more elastomeric elements, such as one or more elastomeric sealing lips fully or partially surrounding the suction opening. Thereby, by using one or more sealing elements surrounding the suction opening, a suction force holding the package to the receiving surface may be sustained and/or improved.

In a further aspect, the present disclosure refers to a vacuum monitoring device, comprising at least one carrier element according to one or more of the embodiments as disclosed above or as disclosed in further detail below. The vacuum monitoring device further comprises at least one receiver. The carrier element, typically the at least one pressure sensor, is adapted for wireless transmission of at least one pressure information indicating the pressure inside the pressure reservoir of the carrier element to the receiver. Preferably, the vacuum monitoring device comprises more than one carrier element, such as at least five carrier elements or at least ten carrier elements or even twenty carrier elements or more.

In a further aspect of the present disclosure, a packaging device for packaging at least one product into at least one package is disclosed. As outlined above, the at least one package typically may comprise at least one folded box, typically at least one folded cardboard box. The packaging device comprises at least one carrier element according to one or more of the embodiments disclosed above or disclosed in further detail below. Preferably, the packaging device comprises a plurality of carrier elements, more typically at least five carrier elements and most typically at least ten carrier elements or even twenty carrier elements or more. The packaging device further comprises at least one transport device. The carrier element is connected to the transport device.

The packaging device is adapted to measure the pressure inside the pressure reservoir of the carrier element by using the pressure sensor of the carrier element. In case a plurality of carrier elements is provided, the packaging device may be adapted to measure the pressure inside one of the carrier elements, a plurality of carrier elements or even all of the carrier elements. Thus, the packaging device may be adapted to measure the pressure inside the pressure reservoirs of a plurality of the carrier elements or even all of the carrier elements simultaneously and/or at different points in time.

The transport device may further be adapted for transporting the carrier element in a closed loop. Thus, the transport device may comprise a chain transport system and/or rail transport system, typically a modular chain transport system and/or a modular rail transport system, typically comprising a plurality of transport modules. The closed loop may be a circular or round closed loop or may comprise an arbitrary shape. Preferably, the at least one carrier element is transported in such a way that the carrier element repeatedly passes one and the same place, such as one and the same working station of the packaging device. One round turn of the closed loop of the transport device may imply exactly one packaging process of one or more packages and/or may even comprise a plurality of packaging processes, by providing appropriate working stations.

The transport device may comprise a closed chain of transport modules. The transport modules may be connected by one or more deformable and/or flexible elements. The at least one carrier element may be connected to the transport modules. Thus, at least one carrier element may be connected to each transport module.

The transport device may further be oriented such that the receiving surface of the carrier element or even the plurality of carrier elements is connected substantially horizontally. Thus, the transport device typically may be oriented such that the receiving surface of all carrier elements of the packaging device is oriented substantially horizontally during the whole process or even a whole transport over the optional closed loop of the transport device. With regard to the term "substantially horizontally", reference may be made to the definition above.

The packaging device may further comprise at least one vacuum device for applying a vacuum to the pressure reservoir. The vacuum device generally may comprise an arbitrary device adapted for providing a vacuum and applying the vacuum to the pressure reservoir. As an example, the vacuum device may comprise at least one vacuum pump and/or at least one vacuum supply, such as at least one vacuum supply line. The packaging device typically may be adapted to apply the vacuum to the pressure reservoir when the carrier element is located in at least one application position of the transport device. Thus, the packaging device may comprise one or more application positions in which vacuum is applied to the pressure reservoir.

The packaging device may further comprise at least one loading device, which may form part of the one or more working stations of the packaging device. The loading device may be adapted to load at least one package onto the receiving surface of the carrier element located in the application position. The package may be pressed onto the application surface of the carrier element by suction exerted by the vacuum inside the pressure reservoir of the respective carrier element. Thus, the loading of the at least one package onto the receiving surface of a carrier element typically takes place simultaneously to the application of the vacuum to the pressure reservoir, such that the suction opening is closed by the at least one package when the vacuum is applied to the respective pressure reservoir. This embodiment allows for avoiding an additional valve element at the suction opening and, still, ensures a fixing of the package onto the receiving surface from the beginning, i.e., immediately after loading of the packaging onto the receiving surface. Thus, the loading device and the vacuum device typically are located in the same position of the packaging device, acting onto the same carrier element in the same position. However, other embodiments are feasible.

The optional vacuum device typically may be adapted to apply a vacuum of no more than 800 mbar to the pressure reservoir, typically a vacuum implying a pressure of no more than 500 mbar and most typically a vacuum of a pressure of no more than 300 mbar. However, other embodiments are possible.

The vacuum device further typically may comprise at least one vacuum port connected to the at least one vacuum source. The at least one vacuum port typically may comprise at least one adapter and/or lug and/or a connecting piece. The packaging device may be adapted to connect the vacuum port with at least one application opening of the pressure reservoir when the carrier element is in the application position.

The packaging device may further comprise at least one venting device. As outlined above, the venting device typically may be adapted to vent the pressure reservoir of at least one carrier element located in at least one venting position. Preferably, the venting may be performed as a passive venting, allowing for a pressure equalization between the pressure reservoir and the ambient atmosphere. Thus, as outlined above, the venting device typically may be adapted to exert a mechanical influence onto at least one valve element of the respective carrier element located in the venting position, thereby typically opening the at least one valve element, allowing for ambient air entering the pressure reservoir of the respective carrier element.

The packaging device may further comprise at least one removal device for removing at least one package from the carrier element located in a specific removal position. Thus, the removal position may be a final position of the packaging process, wherein, in the removal position, the products to be packaged by the packaging device are fully packaged. Preferably, in the removal position, the package fully or partially surrounding the product to be packaged is fully closed, such as by a gluing process. In this removal position, the at least one package located in the removal position may be removed from the packaging device, such as by mechanical force and/or by an compressed air blast. Preferably, the at least one removal position is identical to the at least one above-mentioned optional venting position. Thus, typically, the above-mentioned venting of the at least one pressure reservoir may take place in the at least one removing position, and the venting position and the removing position may be one and the same position of the packaging device.

The packaging device may further comprise at least one receiver. The at least one receiver typically may be adapted to wirelessly receive at least one pressure information indicating the pressure inside the pressure reservoir. Thus, the at least one receiver may unidirectionally and/or bidirectionally exchange information with at least one communication module of the at least one carrier element, typically with a plurality of communication modules of a plurality of carrier elements or even all of the carrier elements. The receiver typically may comprise at least one radio receiver. The receiver may form a component of a control unit of the packaging device. The control unit typically may be adapted to control the packaging device fully or partially, such as by controlling a motion of the at least one transport device and/or by controlling at least one operation of at least one working station of the packaging device, such as an action of the at least one loading device and/or an action of the at least one removal device. Thus, the control unit typically may comprise one or more data processing units, such as one or more microcontrollers. The control unit typically may comprise one or more interfaces, such as one or more human-machine-interfaces allowing for interacting with the packaging device.

The receiver may further be adapted for receiving at least one identification information of the carrier element transmitting the pressure information. With regard to the at least one identification information, reference may be made to the disclosure of the carrier element above.

The packaging device may further be adapted for measuring the pressure inside the pressure reservoir at at least two different points in time, typically over a period of time. Thus, typically, the packaging device may be adapted to monitor the pressure inside the at least one pressure reservoir of the at least one carrier element over a period of time and/or permanently, by recording a plurality of measurement values and/or by storing the at least one pressure information. Besides storing and/or recording the at least one pressure information of the at least one carrier element, the monitoring further may comprise one or more additional steps, such as comparing the at least one pressure information with at least one threshold and/or subjecting the at least one pressure information to at least one pressure condition, checking whether the pressure condition is fulfilled or not. Specifically, the packaging device may be adapted to perform a continuous or permanent monitoring of the pressure inside the at least one pressure reservoir of one carrier element of the packaging device, a plurality of the carrier elements of the packaging device or even all of the carrier elements of the packaging device.

As outlined above, the packaging device may further be adapted for comparing the at least one pressure inside the at least one pressure reservoir of the at least one carrier element with at least one predetermined threshold. Thus, as an example, at least one predetermined threshold may be provided, such as a threshold provided by empiric observations of a suction force, indicating a pressure which is still sufficient for reliably holding the at least one package in place on the receiving surface. In case the pressure inside the pressure reservoir reaches or exceeds the predetermined threshold, a warning may be generated and/or any other type of action may be triggered, such as stopping a packaging process and/or stopping the transport device and/or removing the package from the carrier element having the pressure exceeding the predetermined threshold.

The packaging device may further be adapted for monitoring at least one time course of the at least one pressure inside the at least one pressure reservoir, for one of the carrier elements, for a plurality of the carrier elements or typically for each carrier element of the packaging device. Preferably, a time course of the pressure inside the pressure reservoir is monitored for each carrier element separately. Preferably, the time course of the pressure inside the pressure reservoir is stored in at least one storage device.

As outlined above, the packaging device may further be adapted to generate a warning according to the measured pressure inside the at least one pressure reservoir of the at least one carrier element. Thus, the packaging device may be adapted to generate a warning in case the pressure inside the at least one pressure reservoir fails to fulfill at least one pressure condition. Thus, an underpressure and/or an overpressure may be detected. Thus, the at least one pressure condition may comprise a comparison with one or more of the above-mentioned predetermined thresholds. Additionally or alternatively, the at least one pressure condition may be or may comprise a check whether the pressure falls within a predetermined pressure range.

The carrier element, the vacuum monitoring device or the packaging device may be adapted to perform various functions, either automatically or triggered manually. Thus, one or more of the carrier elements, the vacuum monitoring device and the packaging device may be adapted to perform two or more modes of vacuum monitoring. Thus, as an example, different measurement rates may be used in different modes of operation. Within each mode of operation, a predetermined measurement rate or adjustable measurement rate may be used, such as a constant measurement rate.

Thus, as an example, a normal or low measurement rate may be used in a normal mode, and a high measurement rate may be used in a low pressure mode, such as in case a low pressure is detected, requiring more frequent monitoring. The carrier element may comprise a control unit adapted for switching between the modes. Thus, the carrier element may be adapted to compare the pressure information, such as one or more most recently acquired data points of pressure information, to one or more thresholds, in order to automatically determine whether the normal mode or the low pressure mode shall be used. More than two different modes, such as more than one low pressure mode, may be provided. The control unit may comprise one or more integrated circuits and/or one or more data processing devices. Additionally or alternatively, a test mode may be provided, also referred to as an investigation mode, wherein in the test mode a high measurement rate may be used, such as for testing purposes.

As used herein, the measurement rate generally may be a rate at which the pressure information is acquired by the pressure sensor. Additionally or alternatively, the measurement rate may be a rate of wireless transmission of the pressure information, such as a rate of wireless transmission of the pressure information to a receiver of the vacuum monitoring device and/or of the packaging device.

The switching between the modes may be performed automatically. Additionally or alternatively, an external trigger may be used for switching from one mode to another mode, such as a trigger provided by another component of the vacuum monitoring system and/or of the packaging device, such as a trigger provided by a control unit.

Thus, generally, the carrier element may be adapted to vary the measurement rate, such as automatically or due to an external command or trigger. Therein, two or more predetermined measurement rates may be stored within the carrier element, such as in a data memory of the carrier element, wherein the predetermined measurement rates may be preselected, fixed or adjustable, such as adjustable by external control. The carrier element may be adapted to select the measurement rate in accordance with the pressure information acquired by the pressure sensor, such as one or more most recently acquired data points of pressure information and/or a mean value of recently acquired data points of pressure information. The carrier element may be adapted to compare the pressure information with at least one threshold in at least one comparison step, and the measurement rate may be selected in accordance with a result of the comparison step. The at least one threshold may be predetermined, fixed or adjustable. The at least one threshold may be stored within the carrier element, such as in a data memory of the carrier element, and/or may be provided externally, such as by a control unit. The carrier element may be adapted to use at least two pressure ranges, wherein, in case the pressure information is in a first pressure range, a first measurement rate is selected and wherein, in case the pressure information is in a second pressure range, a second measurement rate is selected. Thus, the first pressure range may comprise pressures lower than pressures comprised in the second pressure range. As an example, the first pressure range may be a normal pressure range, and the second pressure range may be a high pressure range or failure range. As used herein, a normal pressure range generally refers to a pressure range comprising pressures indicating a vacuum sufficient for use in the packaging device, wherein a high pressure range, also referred to as a failure range, generally may refer to a pressure range comprising pressures indicating a vacuum insufficient for use in the packaging device. Thus, as an example, pressures below a threshold of 400-500 mbar, such as below 450 mbar, may be determined as sufficient for the packaging device, whereas other pressures, specifically higher pressures, may be determined to be insufficient. The threshold may be fixed or adjustable. In case the pressure information is in the high pressure range, a higher measurement rate may be selected than in case the pressure information is in the normal pressure range. Thus, leakages in the carrier element or impending vacuum breaks and failures may be detected immediately, such as in case the pressure is rising.

As an example for normal measurement rates, the measurement rate in the normal pressure range may be 0.01 Hz to 1 Hz, typically 0.05 Hz to 0.5 Hz, more typically 0.1 Hz to 0.2 Hz. In the high pressure range, the measurement rate may be 1 Hz to 100 Hz, typically 2 Hz to 10 Hz, more typically 5 Hz. The high pressure range may be a range of pressures above a threshold (210) of 400 mbar to 600 mbar, typically 450 mbar.

As outlined above, the carrier element may be adapted to be operated in two or more modes. Thus, besides the normal mode and the high pressure mode, one or more modes may be used. As an example, the carrier element may be adapted to be operated in at least one test mode, wherein, in the test mode, a test mode measurement rate is used. The test mode measurement rate may be a high measurement rate, such as the highest feasible measurement rate. As an example, the test mode measurement rate may be 1 Hz to 100 Hz, typically 2 Hz to 20 Hz, more typically 5 Hz.

As outlined above, the switching between two or more modes may be performed automatically and/or triggered externally. Thus, one or more trigger signals may be used for switching the carrier elements to a specific mode. The trigger signal or trigger signals may be transmitted in a wireless fashion and/or in a wire-bound fashion. Thus, as an example, the carrier element may be adapted to receive a trigger signal, such as by a control unit, and to switch to the test mode in case the trigger signal is received.

Further, the carrier element may be adapted to be operated in a sleep mode, wherein, in the sleep mode, no pressure information is acquired by the pressure sensor. Thus, specifically in case an onboard energy source or electric energy storage is comprised in the carrier element, such as at least one battery and/or at least one accumulator, the sleep mode may be a power saving mode or standby mode. Switching to the sleep mode may help to extend lifetime of the electric energy storage. Thus, during phases of inactivity, such as at night or at weekends, when no packaging is performed, the one or more carrier elements of the packaging device may be switched to the sleep mode, automatically and/or by one or more external trigger signals. Thus, as an example, an automatic switching to a sleep mode may be performed in case a longer phase of inactivity is detected. Additionally or alternatively, the carrier element may be adapted to receive at least one sleep trigger signal, such as from a control unit, and the carrier element may be adapted to switch to the sleep mode when the sleep trigger signal is received. The carrier element may further be adapted to receive at least one wakeup trigger signal and to switch back to a normal mode when the wakeup trigger signal is received. In the normal mode, pressure information may be acquired by the pressure sensor.

Further, even the use of the normal measurement mode may extend the lifetime of the electric energy storage, since a lower rate of data acquisition and/or a lower rate of data transmission as compared to the maximum possible rates are possible. Consequently, as compared to the high pressure mode or the test mode, both working at higher rates, energy may be saved.

As outlined above, the measurement rate may imply one or both of a rate at which the pressure information is acquired by the pressure sensor and a rate of wireless transmission of the pressure information. A use of different measurement rates, specifically a use of different rates of wireless transmission of the pressure information, specifically different rates for different modes, may generally contribute to extending the lifetime of the electrical energy storage. Thus, as an example, the measurement itself may take place at a rather low energy consumption, whereas the wireless transmission of the pressure information may require higher electrical energies. Thus, reducing the wireless transmission rate may contribute to the general concept of extending the lifetime of the electrical energy storage.

Further potential embodiments of the packaging device may refer to the transport device. Thus, optionally, the transport device may be adapted to transport the at least one carrier element, typically the plurality of carrier elements, in a tacted or stepwise fashion. Thus, the transport device typically may be adapted to transport the at least one carrier element, typically the plurality of carrier elements, in a stepwise fashion from one working station to the next one. As used herein and as used above, the at least one working station typically may comprise at least one loading device and/or at least one venting device and/or at least one removal device and/or at least one vacuum device. Additionally or alternatively, other working stations may be present, such as at least one gluing station for applying a glue to the packaging and/or at least one folding or closure station for closing the at least one package after inserting the at least one article to be packaged. Again, additionally or alternatively, one or more inspection stations may be present, such as one or more inspection stations with inspection sensors for detecting a misalignment and/or a failure in the packaging process. Each working station may be adapted to handle a plurality of package and/or a plurality of carrier elements at a time, such as nine carrier elements at a time.

As outlined above, the packaging device typically may be adapted for a high-throughput packaging. Thus, the packaging device typically may be adapted to handle at least 100 packagings per minute, typically at least 250 packagings per minute. In this high-throughput process, the above-mentioned suction process with a precisely controllable vacuum inside the at least one pressure reservoir is specifically advantageous with regard to the high acceleration forces involved in this high-throughput packaging process.

In a further aspect of the present disclosure, a method for packaging at least one product into at least one package is disclosed. In this method, the packaging device according to one or more of the above-mentioned embodiments and/or according to one or more of the embodiments mentioned in further detail below is used. The method comprises the following method steps. These method steps may be performed in the mentioned sequence. However, other sequences of method steps are possible. Further, the method may comprise one or more method steps not mentioned in the following list of method steps. Further, one or more of the method steps may be performed fully or partially simultaneously. Further, one or more of the method steps may be performed in a repeated fashion.

The method comprises the following method steps:
- at least one first loading step, wherein in the first loading step at least one package is loaded onto the at least one carrier element of the packaging device, wherein the package is fixed to the packaging surface of the carrier element by suction;
- at least one second loading step, wherein in the second loading step at least one product is loaded into the package;
- at least one measuring step, wherein in the measuring step the pressure inside the pressure reservoir of the carrier element is measured by using the pressure sensor, thereby generating at least one pressure information indicating the pressure inside the pressure reservoir of the carrier element; and
- at least one removal step, wherein in the removal step the package is removed from the carrier.

The at least one measuring step may be performed at different points in time during the sequence of method steps. Thus, typically, the at least one measuring step may be performed at least once in between the first loading step and the second loading step. Thus, before loading the at least one article into the packaging, a correct pressurizing of the at least one pressure reservoir may be checked. In case the pressure fails to fulfill a specific pressure condition, the packaging process may be stopped before the second packaging step, such as by removing the package from the packaging process. This embodiment is specifically advantageous since the loading of the article to be packaged into the package requires a rather high precision of positioning of the packaging.

Misalignments may lead to a damaging of the packaging device. Thus, the method typically may be performed such that the package is removed from the carrier element before performing the second loading step in case the pressure information fails to fulfill at least one predetermined pressure condition and/or the packaging process is stopped and/or the respective packaging is not loaded with an article Additionally or alternatively, the at least one measuring step may be performed at least once before a specific gluing step. In this gluing step, a glue may be applied to at least one surface of the package, such as to a surface of a flap or fold of the package. This gluing typically requires a rather delicate gluing tool which, again, requires a precise positioning of the package to which the glue is to be applied. The delicate tool thus may easily be damaged by a misalignment of the package due to pressure failure inside the pressure reservoir.

The method may further be performed such that a plurality of the carrier elements is used. The pressures inside the pressure reservoirs of the carrier elements may be monitored. Therein, carrier elements whose pressure information fails to fulfill at least one predetermined pressure condition may be subject to a maintenance step outside of the packaging device itself. Thus, carrier elements whose pressure information fails to fulfill at least one predetermined pressure condition may be removed from the packaging device and may be subject to a maintenance step in at least one maintenance station. In this maintenance step, specific measures may be taken in order to improve the vacuum holding capabilities of the specific carrier element. Thus, as an example, at least one sealing element may be changed during the maintenance step.

The method may further be performed such that a plurality of the carrier elements is used, wherein a time course of the pressures inside the pressure reservoirs of the carrier elements, typically of all of the carrier elements, is monitored for the carrier elements, typically for each of the carrier elements. Thus, a database comprising the time course of the pressures inside the pressure reservoirs for the carrier elements, typically for each of the carrier elements, may be generated, for inspection by maintenance staff and/or for automatic surveillance of the pressure conditions.

In a further aspect of the present disclosure, a use of a wireless pressure sensor for monitoring a pressure inside a pressure reservoir of a carrier element in a packaging device for packaging at least one product into at least one package is disclosed. In this use, the package is fixed to at least one receiving surface of the carrier element by suction exerted by a vacuum inside the pressure reservoir.

Summarizing the above-mentioned findings, the following embodiments are typical within the present disclosure:

Embodiment 1

A carrier element for use in a packaging device, wherein the carrier element is connectable with at least one transport device of the packaging device, wherein the carrier element comprises at least one receiving surface for receiving at least one package, wherein the receiving surface comprises at least one suction opening for fixing the package by suction, wherein the carrier element further comprises at least one pressure reservoir connected to the suction opening, wherein the carrier element further comprises at least one pressure sensor for measuring a pressure inside the pressure reservoir.

Embodiment 2

The carrier element according to the preceding embodiment, wherein the carrier element, typically the pressure sensor, is adapted for wireless transmission of at least one pressure information indicating the pressure inside the pressure reservoir to at least one receiver.

Embodiment 3

The carrier element according to the preceding embodiment, wherein the carrier element, typically the pressure sensor, comprises at least one communication module for wirelessly transmitting the pressure information.

Embodiment 4

The carrier element according to any of the two preceding embodiments, wherein the carrier element, typically the pressure sensor, is adapted for transmitting the pressure information via radio transmission to the receiver.

Embodiment 5

The carrier element according to any of the three preceding embodiments, wherein the carrier element, typically the pressure sensor, is further adapted to transmit at least one identification information to the receiver, wherein the identification information is adapted to identify the carrier element.

Embodiment 6

The carrier element according to any of the four preceding embodiments, wherein the carrier element is adapted to vary a measurement rate, wherein the measurement rate is selected from the group consisting of a rate at which the pressure information is acquired by the pressure sensor and a rate of wireless transmission of the pressure information.

Embodiment 7

The carrier element according to the preceding embodiment, wherein the carrier element is adapted to select the measurement rate in accordance with the pressure information acquired by the pressure sensor.

Embodiment 8

The carrier element according to the preceding embodiment, wherein the carrier element is adapted to compare the pressure information with at least one threshold in at least one comparison step, wherein the measurement rate is selected in accordance with a result of the comparison step.

Embodiment 9

The carrier element according to any of the two preceding embodiments, wherein the carrier element is adapted to use at least two pressure ranges, wherein, in case the pressure information is in a first pressure range, a first measurement rate is selected and wherein, in case the pressure information is in a second pressure range, a second measurement rate is selected.

Embodiment 10

The carrier element according to the preceding embodiment, wherein the first pressure range comprises pressures lower than pressures comprised in the second pressure range, wherein the first pressure range is a normal pressure range and the second pressure range is a high pressure range, wherein, in case the pressure information is in the high pressure range, a higher measurement rate is selected than in case the pressure information is in the normal pressure range.

Embodiment 11

The carrier element according to the preceding embodiment, wherein the measurement rate in the normal pressure range is 0.01 Hz to 1 Hz, typically 0.05 Hz to 0.5 Hz, more typically 0.1 Hz to 0.2 Hz.

Embodiment 12

The carrier element according to any of the two preceding embodiments, wherein the measurement rate in the high pressure range is 1 Hz to 100 Hz, typically 2 Hz to 10 Hz, more typically 5 Hz.

Embodiment 13

The carrier element according to any of the three preceding embodiments, wherein the high pressure range is a range of pressures above a threshold of 400 mbar to 600 mbar, typically 450 mbar.

Embodiment 14

The carrier element according to any of the eight preceding embodiments, wherein the carrier element is adapted to be operated in at least one test mode, wherein, in the test mode, a test mode measurement rate is used.

Embodiment 15

The carrier element according to the preceding embodiment, wherein the test mode measurement rate is 1 Hz to 100 Hz, typically 2 Hz to 20 Hz, more typically 5 Hz.

Embodiment 16

The carrier element according to any of the two preceding embodiments, wherein the carrier element is adapted to receive a trigger signal and to switch to the test mode in case the trigger signal is received.

Embodiment 17

The carrier element according to any of the preceding embodiments, wherein the carrier element is adapted to be operated in a sleep mode, wherein, in the sleep mode, no pressure information is acquired by the pressure sensor.

Embodiment 18

The carrier element according to the preceding embodiment, wherein the carrier element is further adapted to receive at least one sleep trigger signal, wherein the carrier element is adapted to switch to the sleep mode when the sleep trigger signal is received.

Embodiment 19

The carrier element according to any of the two preceding embodiments, wherein the carrier element is further adapted to receive at least one wakeup trigger signal, wherein the carrier element is adapted to switch back to a normal mode when the wakeup trigger signal is received, wherein, in the normal mode, pressure information is acquired by the pressure sensor.

Embodiment 20

The carrier element according to any of the preceding embodiments, wherein the carrier element further comprises at least one electric energy storage for providing electric energy to the pressure sensor, typically at least one battery and/or at least one electric accumulator.

Embodiment 21

The carrier element according to any of the preceding embodiments, wherein the carrier element is reversibly connectable to the transport device.

Embodiment 22

The carrier element according to any of the preceding embodiments, wherein the carrier element may be handled independently from the transport device.

Embodiment 23

The carrier element according to any of the preceding embodiments, wherein the pressure reservoir comprises at least one cavity inside a body of the carrier element.

Embodiment 24

The carrier element according to any of the preceding embodiments, wherein the pressure reservoir comprises at least one application opening for applying a vacuum to the pressure reservoir.

Embodiment 25

The carrier element according to the preceding embodiment, wherein the carrier element further comprises at least one valve element connected to the application opening.

Embodiment 26

The carrier element according to the preceding embodiment, wherein the valve element comprises at least one check valve.

Embodiment 27

The carrier element according to any of the two preceding embodiments, wherein the valve element is adapted to be opened, typically by mechanical influence, wherein a venting of the pressure reservoir may be initiated.

Embodiment 28

The carrier element according to any of the four preceding embodiments, wherein the application opening is spatially separated from the receiving surface.

Embodiment 29

The carrier element according to the preceding embodiment, wherein the application opening is located inside a substantially vertically oriented surface, wherein the receiving surface is oriented substantially horizontally.

Embodiment 30

The carrier element according to any of the preceding embodiments, wherein the suction opening comprises at least one vacuum cup.

Embodiment 31

A vacuum monitoring device, comprising at least one carrier element according to any of the preceding embodiments, the vacuum monitoring device further comprising at least one receiver, wherein the carrier element is adapted for wireless transmission of at least one pressure information indicating the pressure inside the pressure reservoir of the carrier element to the receiver.

Embodiment 32

A packaging device for packaging at least one product into at least one package, wherein the packaging device comprises at least one carrier element according to any of the preceding embodiments referring to a carrier element, wherein the packaging device further comprises at least one transport device, wherein the carrier element is connected to the transport device, wherein the packaging device is adapted to measure the pressure inside the pressure reservoir of the carrier element by using the pressure sensor of the carrier element.

Embodiment 33

The packaging device according to the preceding embodiment, wherein the transport device is adapted for transporting the carrier element in a closed loop.

Embodiment 34

The packaging device according to any of the preceding embodiments referring to a packaging device, wherein the transport device comprises a closed chain of transport modules, wherein at least one carrier element is connected to each transport module.

Embodiment 35

The packaging device according to any of the preceding embodiments referring to a packaging device, wherein the transport device is oriented such that the receiving surface of the carrier element is oriented substantially horizontally.

Embodiment 36

The packaging device according to any of the preceding embodiments referring to a packaging device, wherein the packaging device further comprises at least one vacuum device for applying a vacuum to the pressure reservoir.

Embodiment 37

The packaging device according to the preceding embodiment, wherein the packaging device is adapted to apply the vacuum to the pressure reservoir when the carrier element is located in at least one application position of the transport device.

Embodiment 38

The packaging device according to the preceding embodiment, wherein the packaging device further comprises at least one loading device, wherein the loading device is adapted to load at least one package onto the receiving surface of the carrier element located in the application position, wherein the package is pressed onto the application surface by suction exerted by the vacuum inside the pressure reservoir.

Embodiment 39

The packaging device according to any of the three preceding embodiments, wherein the vacuum device is adapted to apply a vacuum of no more than 800 mbar to the pressure reservoir, typically a vacuum of no more than 500 mbar and most typically a vacuum of no more than 300 mbar.

Embodiment 40

The packaging device according to any of the four preceding embodiments, wherein the vacuum device comprises at least one vacuum port connected to a vacuum source, wherein the packaging device is adapted to connect the vacuum port with at least one application opening of the pressure reservoir when the carrier element is in the application position.

Embodiment 41

The packaging device according to any of the preceding embodiments referring to a packaging device, wherein the packaging device further comprises at least one venting device, wherein the venting device is adapted to vent the pressure reservoir of at least one carrier element located in at least one venting position.

Embodiment 42

The packaging device according to the preceding embodiment, wherein the packaging device further comprises at least one removal device for removing at least one package from the carrier element located in the venting position.

Embodiment 43

The packaging device according to any of the preceding embodiments referring to a packaging device, wherein the packaging device further comprises at least one receiver, wherein the receiver is adapted to wirelessly receive at least one pressure information indicating the pressure inside the pressure reservoir.

Embodiment 44

The packaging device according to the preceding embodiment, wherein the receiver comprises at least one radio receiver.

Embodiment 45

The packaging device according to any of the two preceding embodiments, wherein the receiver forms a component of a control unit of the packaging device.

Embodiment 46

The packaging device according to any of the three preceding embodiments, wherein the receiver is further adapted for receiving at least one identification information of the carrier element transmitting the pressure information.

Embodiment 47

The packaging device according to any of the preceding embodiments referring to a packaging device, wherein the packaging device is further adapted for monitoring the pressure inside the pressure reservoir of the carrier element.

Embodiment 48

The packaging device according to the preceding embodiment, wherein the packaging device is further adapted for comparing the pressure inside the pressure reservoir with at least one predetermined threshold.

Embodiment 49

The packaging device according to any of the two preceding embodiments, wherein the packaging device is further adapted for monitoring a time course of the pressure inside the pressure reservoir.

Embodiment 50

The packaging device according to any of the preceding embodiments referring to a packaging device, wherein the packaging device is adapted to generate a warning in case the pressure inside the pressure reservoir fails to fulfill at least one pressure condition.

Embodiment 51

The packaging device according to any of the preceding embodiments referring to a packaging device, wherein the transport device is adapted to transport the carrier element in a tacted or stepwise fashion.

Embodiment 52

The packaging device according to any of the preceding embodiments referring to a packaging device, wherein the packaging device is adapted to handle at least 100 packagings per minute, typically at least 250 packagings per minute.

Embodiment 53

A method for packaging at least one product into at least one package, wherein the packaging device according to any of the preceding embodiments referring to a packaging device is used, the method comprising the following steps:
  at least one first loading step, wherein in the first loading step at least one package is loaded onto the at least one carrier element of the packaging device, wherein the package is fixed to the receiving surface of the carrier element by suction;
  at least one second loading step, wherein in the second loading step at least one product is loaded into the package;
  at least one measuring step, wherein in the measuring step the pressure inside the pressure reservoir of the carrier element is measured by using the pressure sensor, thereby generating at least one pressure information indicating the pressure inside the pressure reservoir of the carrier element; and
  at least one removal step, wherein in the removal step the package is removed from the carrier element.

Embodiment 54

The method according to the preceding embodiment, wherein the measuring step is performed at least once in between the first loading step and the second loading step.

Embodiment 55

The method according to any of the two preceding embodiments, wherein the package is removed from the carrier element before performing the second loading step in case the pressure information fails to fulfill at least one predetermined pressure condition.

Embodiment 56

The method according to any of the preceding embodiments of the method, wherein the method is interrupted in case the pressure information fails to fulfill at least one predetermined pressure condition.

Embodiment 57

The method according to any of the preceding embodiments of the method, wherein a plurality of the carrier elements is used, wherein the pressures inside the pressure reservoirs of the carrier elements are monitored, wherein carrier elements whose pressure information fails to fulfill at least one predetermined pressure condition are subject to a maintenance step.

Embodiment 58

The method according to any of the preceding embodiments referring to a method, wherein a plurality of the carrier elements is used, wherein a time course of the pressures inside the pressure reservoirs of the carrier elements is monitored for each of the carrier elements.

Embodiment 59

A use of a wireless pressure sensor for monitoring a pressure inside a pressure reservoir of a carrier element in a packaging device for packaging at least one product into at least one package, wherein the package is fixed to at least one receiving surface of the carrier element by suction exerted by a vacuum inside the pressure reservoir.

The carrier element, the vacuum monitoring device, the packaging device, the method and the use according to the present disclosure, in one or more of the embodiments disclosed herein, imply a large number of specific advantages over known devices and processes.

Thus, as discussed above, many prior art applications are based on the assumption that no pressure rise in vacuum carriers occurs. As an example, U.S. Pat. No. 8,561,779 B2 explicitly points out that no vacuum break occurs in the packaging carrier. This assumption, however, turned out to be over-optimistic in practical applications, as numerous experiments showed. Still, specifically by using wireless transmission of pressure information, the technical challenges of moving carrier elements may be faced, as opposed e.g., to stationary pressure measurements disclosed in US 2011/0023423 A1 or other measurements of parameters in stationary devices.

Thus, a packaging process may be realized, in which the package, such as a folded box and most typically a folded cardboard box, remains precisely fixed and precisely positioned on the carrier element during the whole process. Thus, a loading of the package with one or more articles, as well as a closure of the package, optionally supported by a gluing process, may be realized at a high precision. Delicate tools may be used in the packaging process, such as delicate grippers and/or delicate actuators and/or handling components, wherein the risk of damaging these components by imprecisely positioned packages is significantly reduced. The precisely controlled vacuum, typically supported by the at least one vacuum cup, in conjunction with the precisely controllable vacuum inside the pressure reservoir, leads to a high-precision process which may even be realized at a rather high throughput. When applying the packages to the carrier element, the above-mentioned vacuum device may be connected to the carrier element, such as by connecting the optional vacuum poured to the optional application opening of the pressure reservoir of the respective carrier element. Thus, by applying the vacuum, the package resting on the receiving surface may be sucked to the receiving surface by suction forces. The pressure reservoir holding the vacuum may supply one or more of the suction openings with appropriate vacuum.

When leaving the application position, the vacuum device typically is separated from the carrier element. The vacuum inside the pressure reservoir typically is sustained by the at least one valve element. Still, the vacuum inside the pressure reservoir may be precisely monitored. Thus, in case a vacuum failure should occur during the packaging process, such as during a movement of the carrier element by the transport device, the failure may easily be identified via the at least one pressure sensor. Thus, the likelihood of a misalignment of the package on the carrier element and the likelihood of a collision of the packaging with one or more other components of the packaging device may significantly be reduced.

The pressure sensor, specifically the wireless pressure sensor, even may be implemented into existing packaging devices, such as during a refitting and/or upgrade process. A permanent monitoring of the vacuum inside the pressure reservoirs of each and every carrier element of the packaging device is thereby easily feasible. Still, the carrier elements of the packaging device may be handled separately, as self-sustained units of the packaging device. A permanent vacuum supply to these carrier elements by permanent vacuum connections to the carrier elements, which might cause a significant technical effort, may be avoided. A separate handling of each and every carrier element and/or a separate monitoring of each and every pressure inside the pressure reservoir of each and every carrier element may easily be realized.

Specifically, by using wireless data transmission from the pressure sensors to the at least one receiver, such as by transmitting the at least one pressure information and/or by transmitting the at least one identification information, a high-precision monitoring of the vacuum inside the pressure reservoirs may be realized even in high-throughput packaging devices. The pressure sensors may be optimized with regard to data transmission, data transmission frequency, battery lifetime as well as the option of battery exchange. Thus, the at least one carrier element may comprise at least one exchangeable or removable electric energy storage, typically optimized to the use in the packaging device. Further, over a region of the packaging device to be monitored, a plurality of receivers may be placed. Thus, the amount of pressure sensors monitored by each receiver may be reduced to a minimum. Generally, in case a plurality of receivers is used in the packaging device, redundant data received by the receivers, such as pressure information originating from one and the same carrier element received by more than one receiver, may be filtered and/or eliminated.

Further, the packaging device may provide precise data to maintenance staff operating the packaging device. Thus, statistical data may be provided allowing for a statistical evaluation of a plurality of carrier elements, such as allowing for a statistical evaluation of a relative frequency or frequency of occurrence of pressure failures for the carrier elements, such as for each carrier element. Further, additionally or alternatively, the statistic frequency or relative frequency of failure occurrence may be evaluated with regard to the working stations of the packaging device. Thus, specific working positions in using a relatively high occurrence of failures may be detected, allowing for optimization steps regarding these working stations.

Further, additionally or alternatively, the monitoring of the pressure allows for a testing of various types of package materials. Thus, packages having different types of cardboard materials may be evaluated with regard to their suitability in the specific packaging device.

Further, the method and the packaging device enables a routine check or analysis of each carrier element, such as by monitoring a test time course of the pressure in the pressure reservoir, as compared to different stations and/or different positions during the packaging process and/or during a round-trip along a closed-loop transport device.

In order that the embodiments of the present disclosure may be more readily understood, reference is made to the following examples, which are intended to illustrate the invention, but not limit the scope thereof.

In FIG. 1, a side view of a potential embodiment of a carrier element 110 and a schematic view of a vacuum monitoring device 112 are depicted. The carrier element 110, in this specific embodiment, may comprise a body 114, which, in this specific embodiment, has a rectangular shape. However, other embodiments are possible. The carrier element 110 comprises a substantially horizontal receiving surface 116, onto which a package, into which an article has to be packaged, may be loaded, the package (not depicted) flatly resting on the receiving surface 116. As indicated in FIG. 1, the receiving surface 116 may provide one or more suction openings 118, each suction opening 118 typically having a vacuum cup 120, allowing for holding the package in place by suction forces.

The carrier element 110 may further have a mount 122, the mount 122 providing a mounting surface 124, and an application surface 126 with at least one application opening 128. The mounting surface 124 may provide one or more connecting elements 130, such as one or more screws and/or bolts, for connecting the carrier element 110 to a transport device of a packaging device. Alternatively, the connecting element 130 may be used for connecting the carrier element 110 to a different type of device, such as a maintenance mount for maintenance purposes. As outlined above, the carrier element 110, in this specific embodiment, typically may have an L-shape. Thus, the receiving surface 116 may be oriented in a substantially horizontal fashion, whereas the mounting surface 124 and the application surface 126 may be oriented in a substantially vertical fashion, thereby forming the shape of an L. However, other orientations are feasible.

The suction opening 118 and the application opening 128 both are connected to a pressure reservoir, which is not visible in FIG. 1 and which is symbolically denoted by reference number 132. In between the application opening 128 and the pressure reservoir 132, as outlined in further detail below, at least one valve element 134 may be provided, such as at least one check valve. Once the suction opening 118 is blocked by the package and once a vacuum is applied to the pressure reservoir 132 through the application opening 128, the valve element 134 may be adapted to hold the vacuum, by preventing a pressure equalization through the application opening.

The carrier element 110 further has at least one pressure sensor 136, adapted to measure a pressure inside the pressure reservoir 132. The pressure sensor 136, typically, is a wireless pressure sensor, comprising an internal energy storage 138 and at least one communication module 140 for wireless transmission, typically radio transmission, of at least one pressure information and, optionally, of at least one identification information, to at least one receiver 142. The receiver 142, which is schematically depicted in FIG. 1, may be a radio receiver. The receiver 142 also forms part of the vacuum monitoring device 112 and is adapted for wireless unidirectional or bidirectional data exchange with the carrier element 110, typically with the pressure sensor 136. The pressure information, in FIG. 1, is symbolically denoted by reference number 144, and the identification information is symbolically denoted by reference number 146.

The carrier element 110 may optionally comprise further elements, such as one or more positioning elements 148, allowing for a positioning of the carrier element 110 when used in a packaging device.

Figure 2:
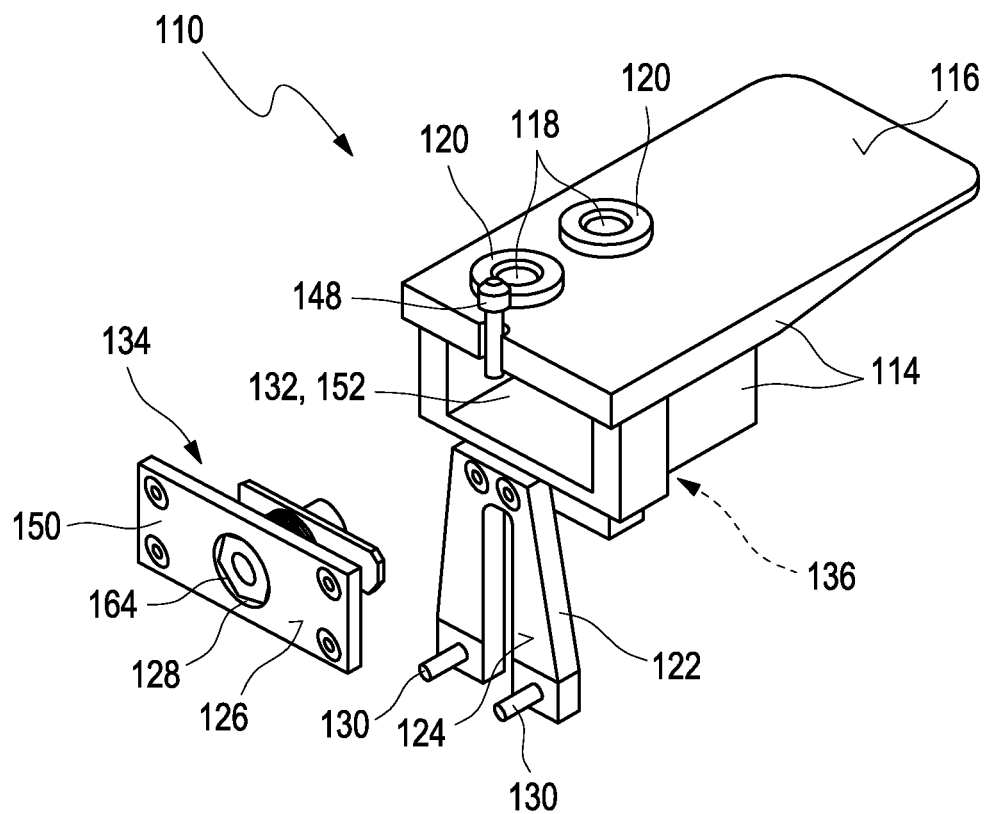
FIG. 2 shows an exploded view of the carrier element according to FIG. 1 with disassembled valve element.

In FIG. 2, an exploded view of the carrier element 110 of FIG. 1 is depicted. In this exploded perspective view, a cover plate 150 is unmounted from the body 114, wherein the cover plate 150 may form the application surface 126 and may comprise the application opening 128. The cover plate 150 may further hold the valve element 134.

As can be seen in FIG. 2, the pressure reservoir 132 may simply be formed by a cavity 152 inside the body 114, covered by the cover plate 150. The cover plate 150 may be mounted to the body 114 by one or more appropriate mounting elements. Further, in between the cover plate 150 and the body 114, the valve element 134 may be provided, as well as one or more sealing elements. Thus, one or more O-rings and/or other types of sealing elements may be provided. The valve element 134 typically may be a spring-loaded valve element which may be biased by one or more appropriate biasing elements and/or by one or more spring elements. The valve element 134 or parts thereof may be accessible through the application opening 128, thereby allowing for exerting a mechanical influence onto the valve element 134 from the application surface 126, thereby opening the valve element 134 and allowing for a venting of the pressure reservoir 132. However, other embodiments are feasible.

The carrier element 110 as depicted in FIGS. 1 and 2 may be a self-sustained carrier element, which may be handled independently from any other components of a packaging device and/or of the vacuum monitoring device 112. Thus, a vacuum inside the pressure reservoir 132 may be maintained even though the carrier element 110 is separated from a vacuum source, specifically with a package positioned on the receiving surface 116, the package sealing the suction opening 118. The pressure inside the pressure reservoir 132 may be monitored in a wireless way by the pressure sensor 136.

Figure 3:
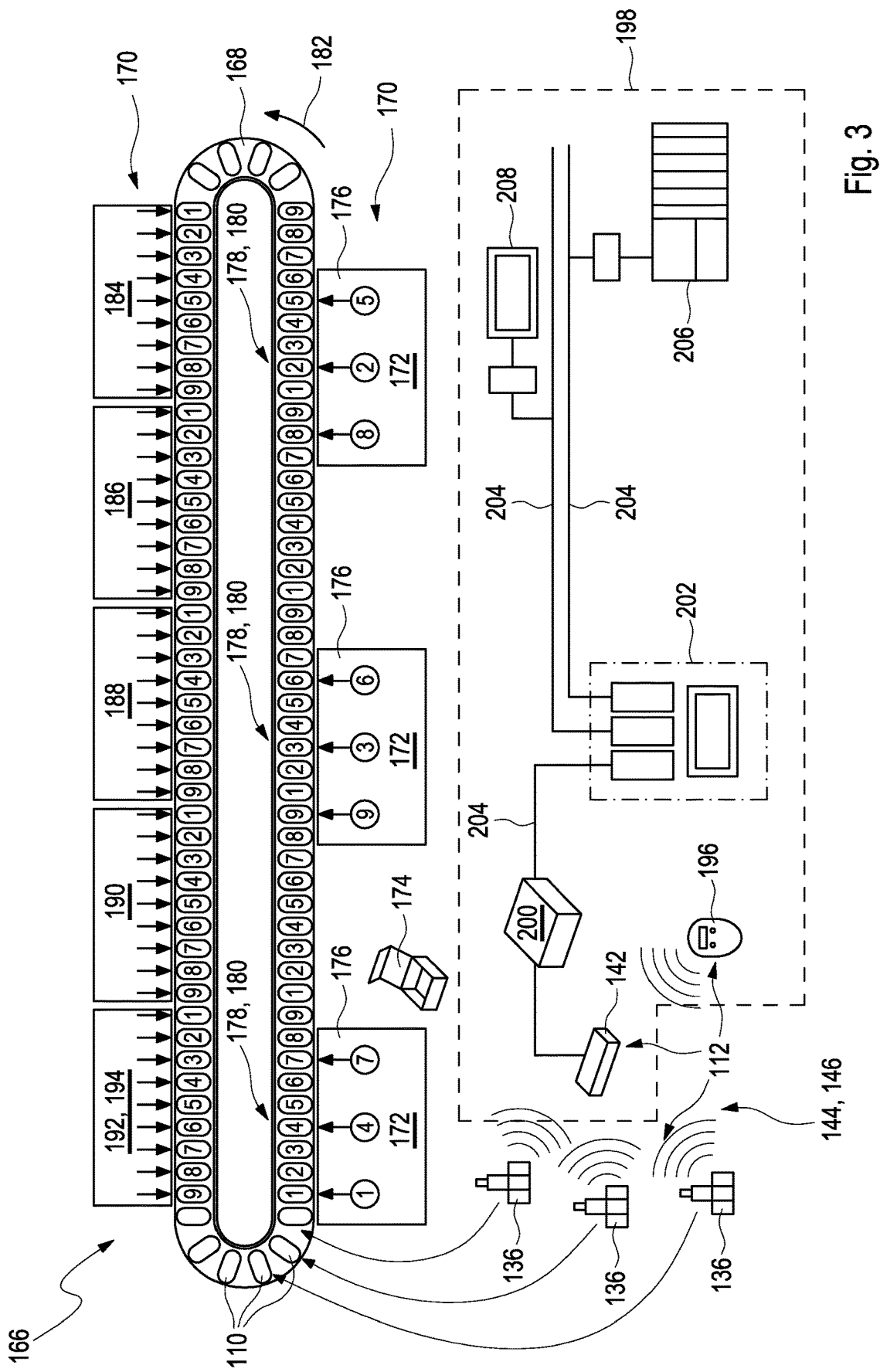
FIG. 3 shows an embodiment of a packaging device.

In FIG. 3, a schematic view of a potential packaging device 166 is depicted. The packaging device 166 contains a plurality of carrier elements 110, such as the carrier elements 110 depicted in FIGS. 1 and 2. Each carrier element 110, as schematically depicted in FIG. 3, comprises at least one wireless pressure sensor 136, such as wireless sensors used for tire pressure monitoring in automotive technology. The pressure sensors 136, as indicated above in FIG. 1, are adapted for transmitting pressure information 144 and optionally identification information 146 to a receiver 142, such as an antenna. To illustrate the transmission functionality of the pressure sensors 136, three of these pressure sensors 136 are shown as separate elements on the lower left part of FIG. 3. It is, however, pointed out that this schematic view is just given for illustrative purposes and that the pressure sensors 136 actually are components of the respective carriers 110, as outlined above.

As outlined above, as an exemplary embodiment of pressure sensors 136 usable within the present disclosure, reference may be made to commercially available tire pressure sensors. As an example, tire pressure sensors available from Tirecom AG, 9301 Rorschach, Switzerland, may be named. These tire pressure sensors are applicable in a temperature range from −40° C. to 85° C. and may be mounted into the carrier element 110, such as by using an integrated thread. The tire pressure sensors may have an integrated battery and may be capable of transmitting signals, such as at a transmission frequency of 868.3 MHz. The transmission distance may be up to 10 m. However, other types of pressure sensors 136 may be used.

The carrier elements 110 are mounted to a transport device 168, which, typically, may form a closed-loop system. Thus, the transport device 168 may comprise one or more transport modules connected to a transport chain, driven by one or more actuators and/or drives. For the purpose of connecting the carrier elements 110 to the transport device 168, the connecting elements 130 of the carrier elements 110 may be connected to appropriate connecting elements of the transport device 168, such as to appropriate screw holes of the transport modules of the transport device 168.

The packaging device 168 further comprises a plurality of work stations 170, which may be implemented as appropriate modules. Thus, in the embodiment depicted in FIG. 3, these work stations 170 may comprise a plurality of loading devices 172 adapted for loading packages onto the receiving surfaces 116 (not depicted) of the carrier elements 110. In FIG. 3, one package is symbolically denoted by reference number 174. Preferably, the packages 174 may be or may comprise at least one folded box, typically at least one folded cardboard box. The loading device 172 may simultaneously be adapted as or may comprise at least one vacuum device 176, adapted to apply vacuum to the pressure reservoir 132. Thus, the vacuum device 176 may comprise one or more lugs or ports adapted to be connected to the application openings 128. Thus, the position of the at least one loading device 172 may both act as a loading position 178 and as an application position 180, for the carrier elements 110 located in these positions 178, 180 to be simultaneously loaded with the packages 174 and evacuated by the vacuum device 176. In the specific optional embodiment of FIG. 3, a plurality of three loading devices 172 is provided, each allowing for a loading of three carrier elements 110, thereby resulting in a loaded block of carrier elements 110 comprising nine carrier elements. The transport device 168 may be adapted to transport the carrier elements 110 in a stepwise fashion.

After the loading of the carrier elements 110, the carrier elements 110 are transported in a transport direction 182 to further work stations 170. Thus, a station 184 for inserting instruction leaflets or product inserts into the nine packages 174 of the loaded carrier elements 110 may be provided. Further, a station 186 for product insert may be provided, such as for inserting tubes containing one or more test strips or other types of goods into the packages 174. Further, one or more stations 188 for inserting data carriers may be provided, such as for inserting one or more data carriers containing batch information of the products. Further, one or more gluing stations 190 may be provided, for applying glue to parts of the boxes 174. Finally, one or more closure stations 192 may be provided, in which the loaded packages 174 are closed, before removing these closed packages 174 from the respective carrier elements 110. Thus, the closure station 192 or a subsequent station may also act as a removal station 194.

The carrier elements 110 with their respective vacuum monitoring devices 112 and the at least one receiver 142 as outlined above with regard to FIG. 1, may form a vacuum monitoring device 112. The vacuum monitoring device 112 may further comprise one or more modules, such as one or more wireless pressure readers 196. The receiver 142 and, optionally, the pressure reader 196 may form part of a control unit 198 of the packaging device 166. The control unit 198 may form a central control unit or a decentralized unit having a plurality of decentrally located components.

The control unit 198 may comprise a vacuum evaluation unit 200 connected to the receiver 142. This vacuum evaluation unit 200 may be connected to a data processing device 202, such as a data concentrator, via a bus system 204. Thus, a CAN bus system may be used. Further, one or more machine control units 206 may be provided, such as for controlling the work stations 170 and/or the transport device 168 and/or the overall timing of the packaging device 166. This machine control unit 206 may be connected to the data processing device 202 by one or more bus systems 204. Further, one or more user interfaces 208 or user work stations may be provided, optionally also connected to the bus system 206.

The vacuum monitoring device 112 of the packaging device 166 in FIG. 3 may be used for a permanent control of the vacuum conditions inside the pressure reservoirs 132 of the carrier elements 110 of the packaging device 166. This monitoring process is symbolically depicted in FIG. 4. Firstly, again, in the bottom part of FIG. 4, the transport device 168 with the carrier elements 110 is depicted. Above, a diagram indicating the pressure inside the pressure reservoirs 132 is depicted for one specific carrier element 110.

Figure 4:
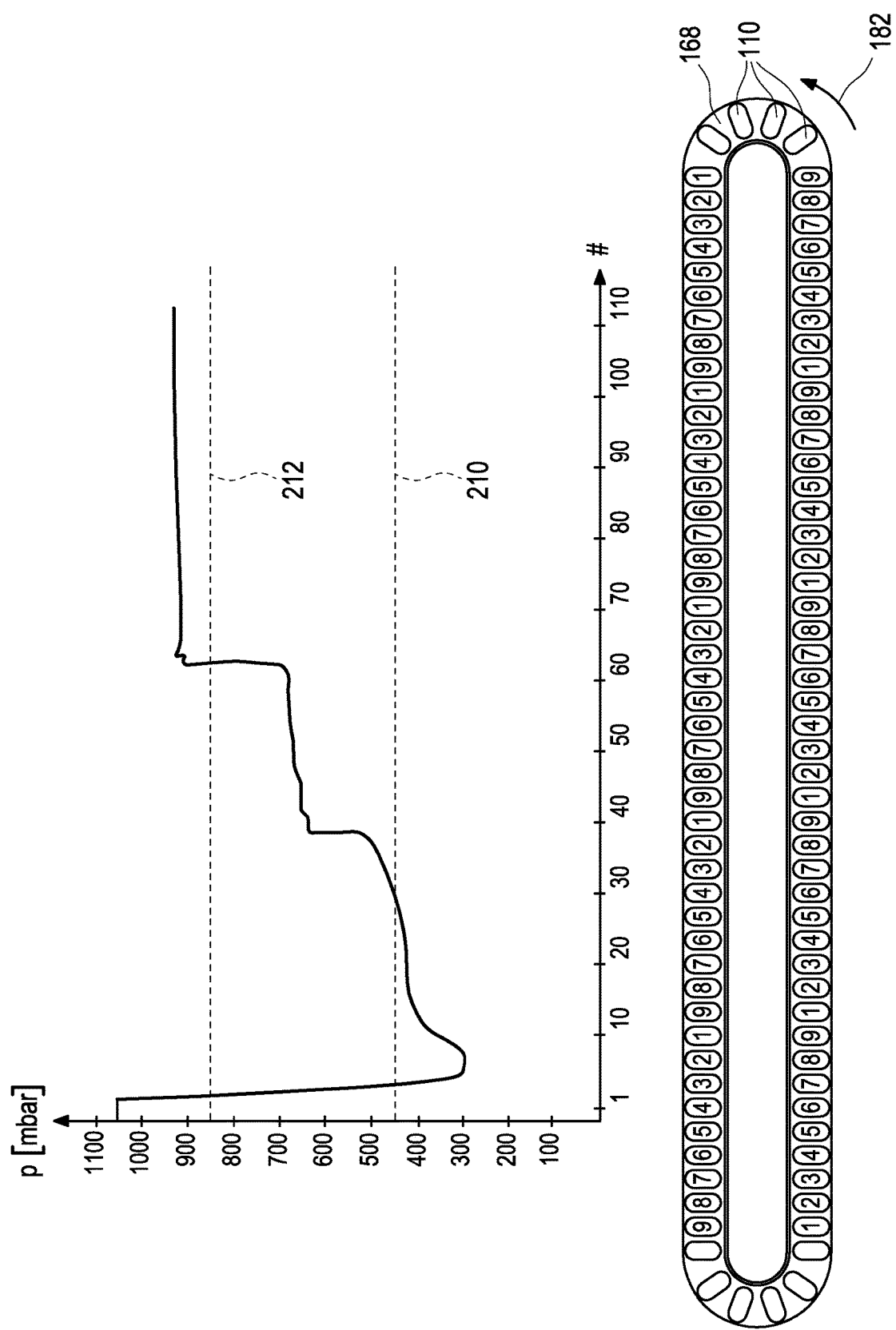
FIG. 4 shows an embodiment of a pressure monitoring process by using the packaging device of FIG. 3.

On the vertical axis, the pressure p is provided as an absolute pressure in mbar. On the horizontal axis, the position of one specific carrier element 110 along the closed loop of the transport system 168 is given, denoted as "#". Firstly, in position 1, indicating the loading position 178 and/or application position 180 in FIG. 3, a vacuum is applied to the pressure reservoir 132. Thus, the pressure inside the pressure reservoir 132 drops down from approximately ambient pressure (approximately 1000 mbar) to a vacuum level having a pressure of approximately 300 mbar. As indicated in FIG. 4, when passing the various work stations 170, the pressure inside the pressure reservoir 132 may continuously be increased or may be increased in a stepwise fashion. The pressure may be monitored as a time course, such as by the vacuum evaluation unit 200. The pressure may be compared to one or more pressure conditions, such as by comparing the pressure with one or more thresholds, as depicted by reference numbers 210 and 212 in FIG. 4. The threshold 210 may indicate a limit value. The pressure inside the pressure reservoir 132 may be considered appropriate if the pressure is below this lower threshold 210. Thus, in the example shown in FIG. 4, approximately 450 mbar are typically found to be a limit value for the vacuum, in order to provide sufficient suction force for keeping the packages 174 in place on the receiving surface 116. Depending on the design of the packaging device and the process parameters of the packaging process, a person skilled in the art would define such thresholds accordingly. For example, a lower threshold of approximately 800 mbar would also be acceptable in other specific embodiments. If the pressure is found below this lower threshold 210, a transmission rate of 0.1 Hz may be chosen, resulting in a data refreshing interval for the pressure value of approximately 10 seconds. In this "normal" range, this data refreshing interval is sufficient to monitor the pressure within the respective pressure reservoir.

As outlined above, in the removal station 194, the packages 174 loaded with the product may be removed from the carrier elements 110. For this purpose, the pressure reservoirs 132 have to be vented, thereby allowing for pressure equalization in the pressure reservoirs 132 as compared to the surrounding ambient atmosphere. For this purpose, the removal station 194 may comprise one or more venting devices, interacting with the valve elements 134 of the carrier elements 110 located in the removal station 194. Thus, the valve elements 134 may simply be opened by exerting mechanical pressure onto the valve elements 134 or parts thereof. The upper threshold 212 in FIG. 4 may be a threshold indicating that the pressure equalization and/or venting has sufficiently taken place, allowing for an easy removal of the packages 174 from the carrier elements 110 or immediate stop of the packaging device. Thus, in the example shown in FIG. 4 approximately 850 mbar are typically found to be a limit value for venting. Depending on the design of the packaging device and the process parameters of the packaging process, a person skilled in the art would define such thresholds accordingly. For example, an upper threshold of approximately 950 mbar would also be acceptable in other specific embodiments.

In case the pressure is found to be in between thresholds 210 and 212, the transmission rate may be changed to 10 Hz, resulting in a data refreshing interval of 100 ms. Such an increase in the transmission rate within this "critical" pressure region of reduced vacuum may be advantageous for monitoring purposes.

Above threshold 212, again, a transmission rate of 0.1 Hz may be chosen, resulting in a data refreshing interval of 10 s. However, other embodiments of the transmission rates and data refreshing intervals are possible.

By recording a time course of the pressure inside the pressure reservoirs 132, such as by recording curves as depicted in FIG. 4 for each carrier element 110, a precise evaluation of the packaging process may be performed. Thus, specifically, carrier elements 110 indicating signs of leakage may easily be detected, by comparing the time course of the pressures inside the pressure reservoirs 132. Thereby, leaky carrier elements 110 may be detected, allowing for subjecting these leaky carrier elements 110 to a maintenance process, such as by exchanging their optional sealing elements. Additionally or alternatively, the curve depicted in FIG. 4 clearly shows that the pressure rise does not occur in a steady fashion, as would be the case in a simple leakage. This is due to the fact that the different embodiments of the work stations 170 interact with the package 174 loaded onto the receiving surface 116 in different ways. Thus, specific work stations 170 may lead to a specifically steep rise in pressure, such as by mechanical shocks. Further, the transport device 168 itself may lead to movements and shocks of the packages 174 during the transportation process. Thus, by detecting these critical interactions with the packages 174 by detecting significant changes in the pressure curve, the overall routine of the packaging device 166 may be optimized, such as by reducing mechanical shocks and/or optimizing mechanical interactions. Thereby, by evaluating the diagrams as depicted in FIG. 4, an important tool may be provided to machine operators and machine developers.

| List of reference numbers |
|---|
| 110 carrier element |
| 112 vacuum monitoring device |
| 114 body |
| 116 receiving surface |
| 118 suction opening |
| 120 vacuum cup |
| 122 mount |
| 124 mounting surface |
| 126 application surface |
| 128 application opening |
| 130 connecting element |
| 132 pressure reservoir |
| 134 valve element |
| 136 pressure sensor |
| 138 energy storage |
| 140 communication module |
| 142 receiver |
| 144 pressure information |
| 146 identification information |
| 148 positioning element |
| 150 cover plate |
| 152 cavity |
| 166 packaging device |
| 168 transport device |
| 170 work stations |
| 172 loading device |
| 174 package |
| 176 vacuum device |
| 178 loading position |
| 180 application position |
| 182 transport direction |
| 184 station for loading instruction leaflet |
| 186 station for product insert |
| 188 station for inserting data carrier |
| 190 gluing station |
| 192 closure station |
| 194 removal station |
| 196 pressure reader |
| 198 control unit |
| 200 vacuum evaluation unit |
| 202 data processing device |
| 204 bus system |
| 206 machine control unit |
| 208 user interface |
| 210 threshold |
| 212 threshold |

It is noted that terms like "preferably", "commonly", and "typically" are not utilized herein to limit the scope of the claimed subject matter or to imply that certain features are critical, essential, or even important to the structure or function of the embodiments disclosed herein. Rather, these terms are merely intended to highlight alternative or additional features that may or may not be utilized in a particular embodiment of the present disclosure.

It is also noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modifications and variations come within the scope of the appended claims and their equivalents.

What is claimed is:

1. A carrier element for use in a packaging device, wherein
the carrier element is connectable with at least one transport device of the packaging device,
the carrier element comprises at least one receiving surface for receiving at least one package,
the receiving surface comprises at least one suction opening for fixing the package by suction,
the carrier element further comprises at least one pressure reservoir connected to the suction opening, and
the carrier element further comprises at least one pressure sensor configured to measure a pressure inside the pressure reservoir, wherein the carrier element is configured to transmit wirelessly at least one pressure information that indicates the pressure inside the pressure reservoir to at least one receiver, wherein the carrier element is configured to vary a measurement rate, and wherein the measurement rate is selected from the group consisting of a rate at which the pressure information is acquired by the pressure sensor and a rate of wireless transmission of the pressure information.

2. The carrier element according claim 1, wherein the carrier element is further configured to transmit at least one identification information to the receiver, wherein the identification information is configured to identify the carrier element.

3. The carrier element according to claim 1, wherein the carrier element is configured to select the measurement rate in accordance with the pressure information acquired by the pressure sensor.

4. The carrier element according to claim 3, wherein the carrier element is configured to use at least two pressure ranges, wherein, in case the pressure information is in a first pressure range, a first measurement rate is selected and wherein, in case the pressure information is in a second pressure range, a second measurement rate is selected, wherein the first pressure range comprises pressures lower than pressures comprised in the second pressure range, wherein the first pressure range is a normal pressure range and the second pressure range is a high pressure range, wherein, in case the pressure information is in the high pressure range, a higher measurement rate is selected than in case the pressure information is in the normal pressure range.

5. The carrier element according to claim 1, wherein the carrier element is configured to be operated in at least one test mode, wherein, in the test mode, a test mode measurement rate selected from a range of 1 Hz to 100 Hz is used.

6. The carrier element according to claim 1, wherein the carrier element is configured to be operated in a sleep mode, wherein, in the sleep mode, no pressure information is acquired by the pressure sensor.

7. The carrier element according to claim 1, wherein the carrier element further comprises at least one electric energy storage for providing electric energy to the pressure sensor.

8. The carrier element according to claim 1, wherein the pressure reservoir comprises at least one application opening for applying a vacuum to the pressure reservoir.

9. The carrier element according to claim 8, wherein the carrier element further comprises at least one valve element connected to the application opening.

10. A vacuum monitoring device, comprising at least one carrier element according to claim 1, the vacuum monitoring device further comprising at least one receiver, wherein the carrier element is adapted for wireless transmission of at least one pressure information indicating the pressure inside the pressure reservoir of the carrier element to the receiver.

11. A packaging device for packaging at least one product into at least one package, wherein the packaging device comprises at least one carrier element according to claim 1, wherein the packaging device further comprises at least one transport device, wherein the carrier element is connected to the transport device, wherein the packaging device is adapted to measure the pressure inside the pressure reservoir of the carrier element by using the pressure sensor of the carrier element.

12. The packaging device according to claim 11, wherein the packaging device further comprises at least one vacuum device for applying a vacuum to the pressure reservoir.

13. The packaging device according to claim 12, wherein the packaging device is adapted to apply the vacuum to the pressure reservoir when the carrier element is located in at least one application position of the transport device.

14. The packaging device according claim 13, wherein the packaging device further comprises at least one loading device, wherein the loading device is adapted to load at least one package onto the receiving surface of the carrier element located in the application position, wherein the package is pressed onto the application surface by suction exerted by the vacuum inside the pressure reservoir.

15. The packaging device according to claim 11, wherein the packaging device further comprises at least one receiver, wherein the receiver is adapted to wireless sly receive at least one pressure information indicating the pressure inside the pressure reservoir.

16. The packaging device according to claim 15, wherein the receiver is further adapted for receiving at least one identification information of the carrier element transmitting the pressure information.

17. A method for packaging at least one product into at least one package, wherein the packaging device according to claim 11 is used, the method comprising the following steps:
at least one first loading step, wherein in the first loading step at least one package is loaded onto the at least one carrier element of the packaging device, wherein the package is fixed to the receiving surface of the carrier element by suction;
at least one second loading step, wherein in the second loading step at least one product is loaded into the package;
at least one measuring step, wherein in the measuring step the pressure inside the pressure reservoir of the carrier element is measured by using the pressure sensor, thereby generating at least one pressure information indicating the pressure inside the pressure reservoir of the carrier element; and at least one removal step, wherein in the removal step the package is removed from the carrier element.

* * * * *

UNITED STATES PATENT AND TRADEMARK OFFICE
CERTIFICATE OF CORRECTION

| | | |
|---|---|---|
| PATENT NO. | : 10,766,652 B2 | Page 1 of 1 |
| APPLICATION NO. | : 14/556479 | |
| DATED | : September 8, 2020 | |
| INVENTOR(S) | : Thomas Jasiulek and Andreas Trapp | |

It is certified that error appears in the above-identified patent and that said Letters Patent is hereby corrected as shown below:

On the Title Page

(73) Assignee, delete "Roche Diagnostics GMBH, Manheim (DE);".

In the Specification

In Column 13, Line(s) 27, delete "at at" and insert --at--.

In the Claims

In Column 34, Line 34, Claim 15, delete "wireless sly" and insert --wirelessly--.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*